United States Patent [19]
Voigt

[11] Patent Number: 5,153,009
[45] Date of Patent: Oct. 6, 1992

[54] EXTRUSION DEVICE

[75] Inventor: Jürgen Voigt, Wathlingen, Fed. Rep. of Germany

[73] Assignee: Hermann Berstorff Maschinenbau GmbH, Hanover, Fed. Rep. of Germany

[21] Appl. No.: 701,032

[22] Filed: May 16, 1991

[30] Foreign Application Priority Data

May 17, 1990 [DE] Fed. Rep. of Germany ....... 4015814

[51] Int. Cl.⁵ .................... B29B 7/48; B29B 7/80
[52] U.S. Cl. .................... 425/204; 425/207; 425/209; 366/77; 366/85; 366/88; 366/190; 366/195; 366/196
[58] Field of Search ............... 425/205, 207, 208, 209, 425/204, 200, 587; 366/77, 79, 81, 85, 88, 190, 272, 194, 195, 196

[56] References Cited

U.S. PATENT DOCUMENTS

| 4,707,139 | 11/1987 | Valenzky et al. | 366/77 |
| 4,890,996 | 1/1990 | Shimizu | 425/205 |
| 5,048,405 | 9/1991 | Takahashi et al. | 366/77 |

FOREIGN PATENT DOCUMENTS

| 344399 | 12/1989 | European Pat. Off. | 366/190 |
| 3842988 | 6/1989 | Fed. Rep. of Germany . | |

Primary Examiner—Jay H. Woo
Assistant Examiner—Khanh P. Nguyen
Attorney, Agent, or Firm—Foley & Lardner

[57] ABSTRACT

An extrusion device for processing thermoplastic plastics material and rubber has a housing and primary screw means rotatably mounted therein. The device includes a discharge zone in which a sleeve member provided with external flights is mounted on a bearing shaft so as to be rotatable about its longitudinal axis, which sleeve member is drivable by the primary screw means but in an opposite direction thereto so as to increase the discharge pressure acting on the material being processed.

17 Claims, 3 Drawing Sheets

EXTRUSION DEVICE

FIELD OF THE INVENTION

The present invention relates to an extrusion device for processing thermoplastic plastics materials and rubber. More particularly, the present invention relates to an extrusion device of the type which comprises at least one screw rotating in a barrel in which screw segments, which are rotatable in opposite directions, are provided in the discharge zone of the extrusion device.

BACKGROUND OF THE INVENTION AND PRIOR ART DISCUSSION

Extrusion devices which comprise at least one screw mounted for rotation in a barrel which barrel includes a feed zone, a pressure augmentation zone and a discharge zone, are known. Such devices are used for extruding thermoplastic plastics materials and rubber. The material to be extruded is usually fed into the extruder in solid form and is converted into a fused mass usually known as a melt. However, it is generally true that the melt must not be subjected to pressures and temperatures which are above certain values which are specific to the particular material being extruded. It is also desirable to prevent the quality of the extruded product from being adversely affected. In consequence, in the discharge zone of the extrusion device, the melt is frequently subjected to a pressure, but this generally produces an unsatisfactory discharge output. A melt pump, which is disposed between the discharge zone of the extrusion device and the extrusion head, permits this pressure to be increased and the discharge output is improved by so doing.

The most common type of melt pump includes a gear pump and an example of such as arrangement is disclosed in German Offenlegungsschrift No. DE-OS 38 42 988. Such arrangement is widely used because it also provides a comparatively good melt conveyance effect.

However gear pump arrangements are disadvantageous in that they are comparatively expensive and also add to the overall length of the extrusion device.

It must also be considered disadvantageous that such gear pumps have to be provided with their own drive means, the output of which is controlled in dependence upon the rate of rotation of the conveyer screws. It must also be remembered that additional energy is introduced into the melt during the extrusion process by a melt pump. To prevent the melt from becoming overheated and, hence, from becoming damaged, the temperature of the melt must not be allowed to exceed a predetermined limit temperature. This necessitates the provision of an elaborate temperature measurement and regulation system in the region of the conveyer screws and the gear pump.

OBJECTS OF THE INVENTION

In consequence, the present invention seeks to provide an extrusion device which is generally of the above-described type, which permits the pressure to be augmented in the region of the discharge zone but requires less technical outlay and enables the extrusion device to have a shorter overall length than known arrangments.

SUMMARY OF THE INVENTION

According to the present invention, there is provided an extrusion device for extruding thermoplastic material selected from the group consisting of plastics material and rubber, comprising a housing; primary screw means mounted for rotation in a first direction within said housing; said housing and said screw means jointly defining a feed zone for said material, a pressure augmentation zone and a discharge zone for said extruded material sequentially traversed by said material; said primary screw means, in said discharge zone, comprising a screw core, said screw core including an external surface and flight means helically disposed around said external surface; and a screw assembly meshing with said primary screw means within said housing in said discharge zones wherein said screw assembly comprises mounting means, a bearing shaft mounted on said mounting means, sleeve means rotatably mounted on said bearing shaft whereby said sleeve is rotatable about said shaft in a second direction opposed to said first direction, said sleeve including an external periphery and screw flight means helically disposed around said external periphery whereby said screw flight means mesh closely with said flight means disposed around said external surface of said core of said primary screw means; and drive means for driving said primary screw means in said discharge zone and said sleeve of said screw assembly in said opposed directions whereby said primary screw means in said discharge zone and said screw assembly jointly co-act as an oppositely directed melt pump for said material.

In one embodiment, the device additionally comprises secondary screw means mounted for rotation in said first direction in said housing and extending through said feed zone and said pressure augmentation zone; said secondary screw means meshing with said primary screw means in said feed zone and said pressure augmentation zone and means coupling said screw assembly to said secondary screw means permitting rotation of said screw assembly and said secondary screw means independently of one another and wherein said coupling is detachable.

It can therefore be seen that there are two screw portions disposed in the discharge zone of the extrusion housing which rotate in opposite directions to one another and therefore co-act as a highly advantageous melt pump. By means of this pump effect, the conveying pressure can be increased because the degree of conveying action produced is enhanced compared with devices in which the screws rotate in the same direction and there is no unnecessarily high input of energy which is harmful to the melt.

In addition, the conveyance of material through the screw portion is largely similar to the conveying action of a conventional extrusion device provided with a gear-type melt pump. This permits the melt to be treated more gently in the discharge zone.

Additional advantages of an extrusion device in accordance with the present invention are that there is no need for the melt pump to be driven separately from the primary screw means and that the elaborate measurement and regulation system required for controlling the speed of a gear-type melt pump is eliminated.

The screw sleeve may be detachably connected to the extrusion housing or, if provided, to the secondary screw means with the proviso that it may not rotate therewith. The portion of the primary screw means located in the discharge zone may be detachably connected to the portion of the primary screw means upstream thereof. By so doing, the portions may be removed, thereby allowing the use of the device as a conventional extrusion device.

BRIEF DESCRIPTION OF THE DRAWINGS

Two embodiments of an extrusion device in accordance with the present invention will be further described, by way of example with reference to the accompanying drawings, in which.

DESCRIPTION OF PREFERRED EMBODIMENTS

Figure 1:
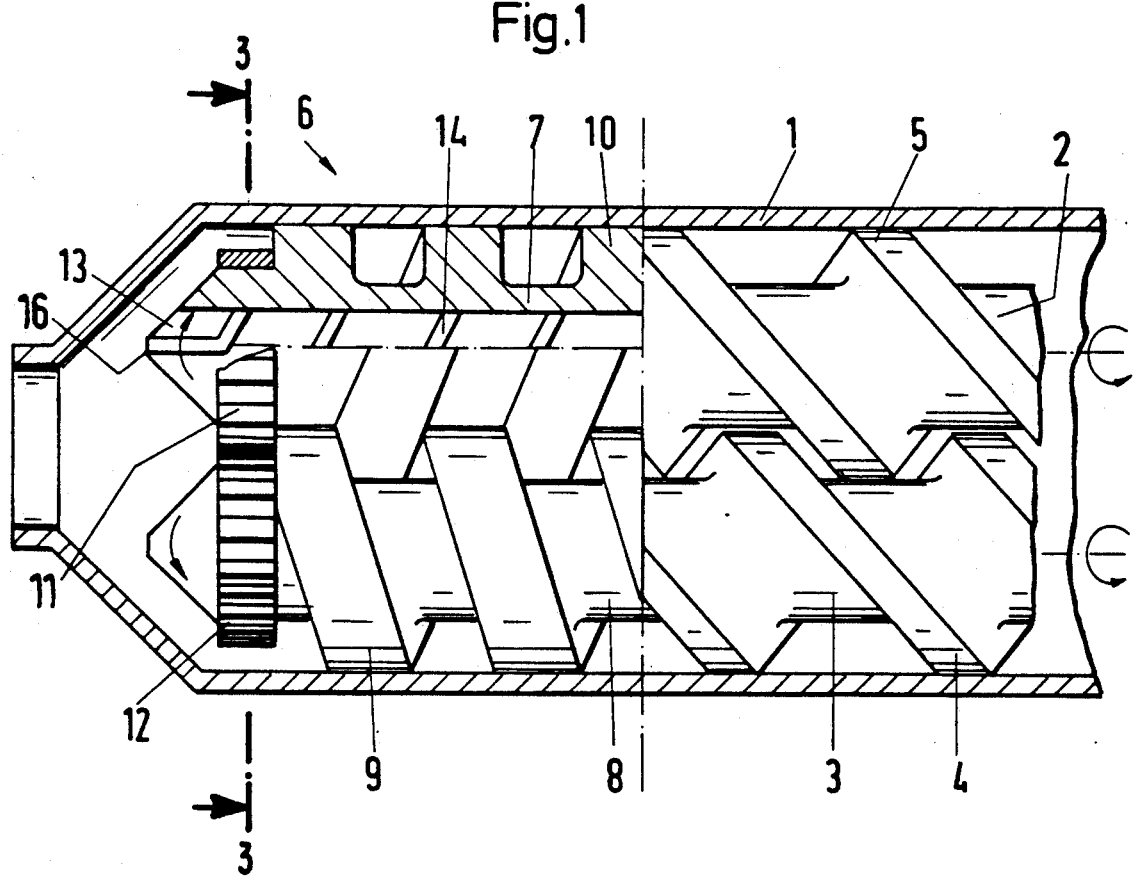
FIG. 1 is a plan view, partially in section, of a twin-screw extrusion device in accordance with the present invention and showing primarily the discharge zone region.

In FIG. 1, there is shown an extrusion device which includes a housing in the form of a barrel 1. The barrel 1 defines a discharge zone 6. Two extrusion screws 2 and 3, which intermesh with one another, are mounted for rotation in the same direction in the region of the extruder upstream of the discharge zone 6. The screws 2 and 3 are provided with helical flights 5 and 4 respectively in the region upstream of the discharge zone 6.

In the discharge zone 6 of the extrusion device, the first extrusion screw 2 comprises a cantilever bearing shaft 13 on which is mounted a sleeve 7, which latter is provided with screw flights 10. The sleeve 7 is thus rotatable about the longitudinal axis of the shaft 13. The screw flights 10 provided on the sleeve 7 have an opposed pitch and a greater width than the screw flights 5 of the screw 2 upstream of the discharge zone 6.

The second extrusion screw 3 has a core 8 which extends into the discharge zone 6. In the zone 6, the core 8 has screw flights 9 formed thereon, which flights 9 have the same width as the screw flights 10. The flights 9 do, however, have a smaller pitch than the flights 4 formed on the screw 3 upstream of the discharge zone 6. The screw flights 9 and 10 on the screw core 8 and on the screw sleeve 7 respectively closely intermesh with one another and are rotated in opposite directions. The arrows shown in FIG. 1 identify the directions of rotation.

The sleeve 7 and the screw core 8 are each provided at their downstream ends with intermeshing pinions 11 and 12 respectively. Accordingly the screw sleeve 7 is drivable by means of the extrusion screw 3 through the intermediary of the screw core 8, the pinion 12 and the pinion 11.

In FIG. 1, the screw sleeve 7 is also supplied with melt, which latter has been removed from the extrusion device and is used as a lubricant. Such melt is supplied as the sleeve rotates on the bearing. A helically extending lubrication groove 14, which can be seen in FIG. 1, is provided both in the screw sleeve 7 and in the bearing shaft 13, which have been cut in their upper halves. The bearing shaft groove is provided in the surface of the bearing shaft 13. The melt is supplied to the lubricant groove 14 through a bore 16 formed in the bearing shaft 13. This bore 16 has a lubricant input at the downstream end of the bearing shaft 13 and terminates, at its upstream end, in the groove 14.

Figure 2:
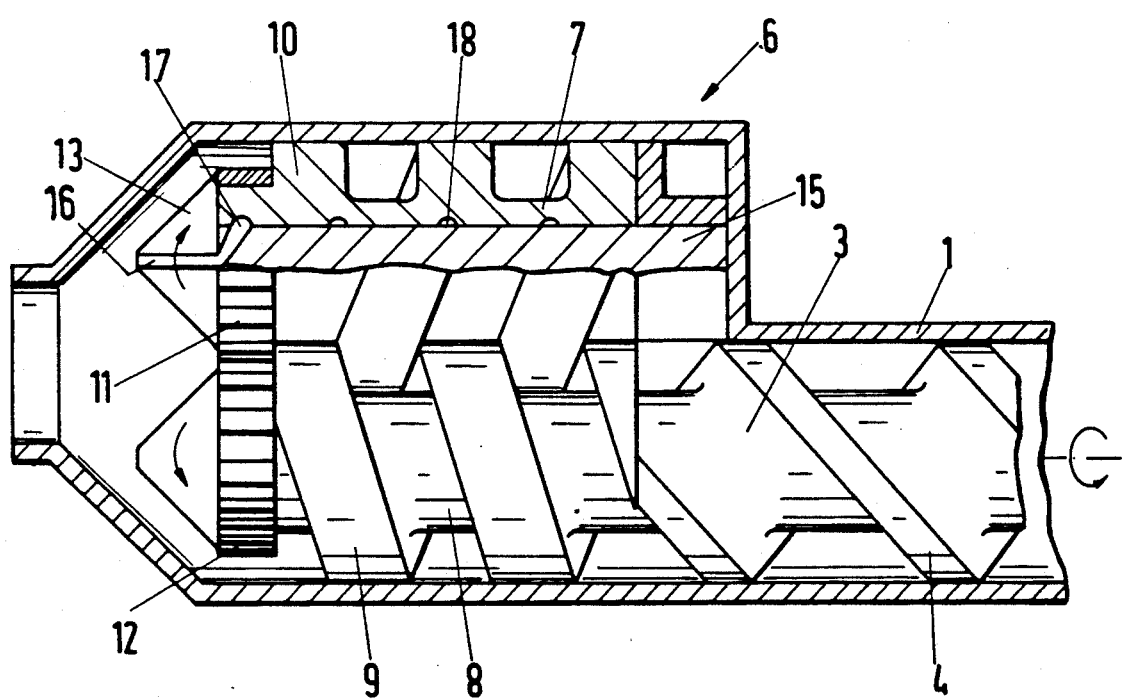
FIG. 2 is a view similar to FIG. 1 but, of a single-screw extrusion device in accordance with the present invention.
Figure 3:
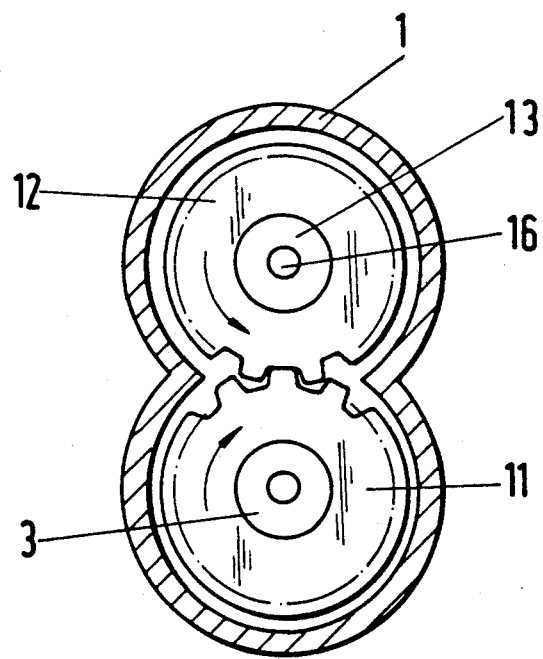
FIG. 3 is a cross-sectional view taken along the lines 3—3 of FIG. 1.

FIG. 2 shows a single screw extrusion device in accordance with the present invention. In such arrangement, a single extrusion screw 3, provided with screw flights 4, is mounted for rotation in an extrusion housing 1 in the form of a barrel. The discharge zone of the barrel 1 is again referenced 6. The extrusion screw 3 has a screw core 8 which extends into the zone 6. In the discharge zone, the core 8 is provided with screw flights 9, the pitch and width of which differ from the pitch and width of the flights 4 provided on the screw 3 upstream of the discharge zone 6.

In this embodiment, the extrusion housing 1 is widened in the discharge zone 6 to define twin bores, one of which accommodates the core 8 and flights 9 and the other of which accommodates a second screw portion. This second portion is in the form of a screw sleeve 7 which is mounted on a cantilevered bearing shaft 15 connected to the housing 1 in such a manner that the sleeve 7 is rotatable about the longitudinal axis of the shaft 15.

The sleeve 7 is provided with external screw flights 10 which have the same width as the flights 9 forming the core 8 of the extrusion screw 3, but the pitches of the two screws are orientated in opposite directions.

At its downstream end, the screw sleeve 7 has a pinion 11 mounted thereon which meshes with a corresponding pinion 12 mounted on the downstream end of the screw core 8.

The screw sleeve 7 is thus directly drivable by the extrusion screw 3 through the intermediary of the screw core 8, the pinion 12 and the pinion 11. As a result of the rotation of the screw sleeve 7 and the screw core 8 in opposite directions to one another, the flights 10 on screw sleeve 7 and the flights 9 on the screw core 8 co-operate with one another to act as a highly effective melt pump, which only produces a slight thermal loading on the melt.

As in the embodiment described with reference to FIG. 1, the screw sleeve 7 is lubricated by melt supplied from the extrusion device whilst it is rotating on the bearing shaft 15. In this embodiment, however, the helical lubricant groove 18 is formed on the inner surface of the screw sleeve 7, which is fed with melt through a bore 16 formed in the bearing shaft 15. A first bore opening is again formed on the downstream end face of the bearing shaft 15. The other bore opening is disposed upstream of the first opening and leads into an annular groove 17, which communicates with the helical lubricant groove 18.

In a simpler structural form, not shown, the lubricant groove 14 or 18 may extend to the downstream end of either the screw sleeve 7 or the bearing shaft 13, with the result that melt can enter the groove 14 or 18 directly.

In a particularly advantageous embodiment of the invention, the length of the screw core 8 and of the screw sleeve 7 is at least 1.5 times the screw pitch in the region of the discharge zone 6. In addition, and as can be seen in FIG. 2, the diameter of each of the pinions 11 and 12 is smaller than the diameter of the screw portions in the discharge zone 6.

I claim:

1. An extrusion device for extruding thermoplastic material selected from the group consisting of plastics material and rubber, comprising a housing; primary screw means mounted for rotation in a first direction within said housing; said housing and said primary screw means jointly defining a feed zone for said material, a pressure augmentation zone and a discharge zone for said extruded material sequentially traversed by said material; said primary screw means, in said discharge zone, comprising a screw core, said screw core including an external surface and flight means helically disposed around said external surface; and a screw assembly meshing with said primary screw means within said housing in said discharge zone wherein said screw assembly comprises mounting means, a bearing shaft mounted on said mounting means, and a sleeve rotatably mounted on said bearing shaft wherein said sleeve is rotatable about said shaft in a second direction opposed to said first direction, said sleeve including an external periphery and screw flight means helically disposed around said external periphery wherein said screw flight means mesh closely with said flight means disposed around said external surface of said core of said primary screw means; and drive means for driving said primary screw means in said discharge zone and said sleeve of said screw assembly in said opposed directions whereby said primary screw means in said discharge zone and said screw assembly jointly coact as an oppositely directed melt pump for said material.

2. An extrusion device as recited in claim 1 additionally comprising secondary screw means mounted for rotation in said first direction in said housing and extending through said feed zone and pressure augmentation zone; said secondary screw means meshing with said primary screw means in said feed zone and said pressure augmentation zone and means coupling said screw assembly to said secondary screw means permitting rotation of said screw assembly and said secondary screw means independently of one another and wherein said coupling is detachable.

3. An extrusion device as recited in claim 1 wherein said fixed mounting means comprises a portion of said housing in said discharge zone.

4. An extrusion device as recited in claim 1 wherein said primary screw means includes a screw core in said feed and said pressure augmentation zones and wherein said screw core in said zones is integral with said core of said primary screw means in said discharge zone.

5. An extrusion device as recited in claim 1 wherein said primary screw means includes a screw core in said feed and said pressure augmentation zones, said device further including means coupling said screw core in said zones to said screw core of said primary screw means in said discharge zone whereby said screw cores are rotatable in dependence upon one another and wherein said coupling is detachable.

6. An extrusion device as recited in claim 1 wherein said screw sleeve includes a discharge end region and said primary screw means includes a discharge end region in said discharge zone, said device further including a first pinion mounted on said discharge end region of said sleeve and a second pinion mounted on said discharge end region of said primary screw means; each said pinion including an external periphery and teeth formed on said periphery, said teeth on said first pinion meshing with said teeth on said second pinion.

7. An extrusion device as recited in claim 1 wherein a pitch of said flight means of said primary screw means in said discharge zone is less than a pitch of said flight means of said primary screw means immediately upstream of said discharge zone and a width of said flight means of said primary screw means in said discharge zone is greater than a width of said flight means of said primary screw means immediately upstream of said discharge zone.

8. An extrusion device as recited in claim 2 wherein a pitch of said flight means of said sleeve in said discharge zone is less than a pitch of said flight means of said secondary screw means immediately upstream of said discharge zone and a width of said flight means of said sleeve in said discharge zone is greater than a width of said flight means of said secondary screw means immediately upstream of said discharge zone.

9. An extrusion device as recited in claim 6 wherein said pinions, said sleeve and said screw core of said primary screw means each has a diameter wherein said diameters of said pinions are less than said diameter of said screw sleeve and said screw core in said discharge zone.

10. An extrusion device as recited in claim 1 wherein said screw sleeve and said screw core of said primary screw means each has a length and said length is at least 1.5 times the pitch of said primary screw means in said discharge zone.

11. An extrusion device as recited in claim 1 wherein said screw sleeve includes an internal surface said internal surface defining a helical groove, said internal surface defining an annular groove at its downstream end wherein said helical groove communicates with said annular groove.

12. An extrusion device as recited in claim 11 wherein said bearing shaft defines an axial bore, said axial bore including opposed upstream and downstream end regions, said upstream end region of said bore communicating with said annular groove and said downstream end region of said bore terminating downstream of said discharge zone.

13. An extrusion device as recited in claim 1 wherein said bearing shaft includes an external surface, said external surface defining a helical groove, said bearing shaft further defining an axial bore, said axial bore having opposed upstream and downstream and downstream end regions, said upstream end of said axial bore communicating with said helical groove and said downstream end of said axial bore terminating downstream of said discharge zone.

14. An extrusion device as recited in claim 11 wherein said screw sleeve includes a downstream end portion and wherein said helical groove extends to said downstream end portion.

15. An extrusion device as recited in claim 11 wherein said bearing shaft includes a downstream end portion and wherein said helical groove extends to said downstream end portion of said bearing shaft.

16. An extrusion device as recited in claim 3 wherein said fixed mounting means on said housing mounting said bearing shaft is a cantilever mounting.

17. An extrusion device as recited in claim 1 wherein said means mounting said bearing shaft is detachably connected to said housing.

* * * * *